United States Patent
Hanners et al.

(10) Patent No.: US 7,548,979 B2
(45) Date of Patent: Jun. 16, 2009

(54) METHOD, SYSTEM, AND COMPUTER-READABLE MEDIUM FOR MANAGING A HOST SESSION ON A REMOTE COMPUTER

(75) Inventors: Joseph M. Hanners, Birmingham, AL (US); Calvin Laurance, Pell City, AL (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1070 days.

(21) Appl. No.: 10/612,427

(22) Filed: Jul. 1, 2003

(65) Prior Publication Data

US 2005/0005015 A1 Jan. 6, 2005

(51) Int. Cl.
*G06F 15/173* (2006.01)
*G06F 9/44* (2006.01)
(52) U.S. Cl. .................... 709/227; 717/109
(58) Field of Classification Search ............. 709/203, 709/227–228; 707/10; 717/109, 112
See application file for complete search history.

(56) References Cited

U.S. PATENT DOCUMENTS

| | | | | |
|---|---|---|---|---|
| 5,734,871 A * | 3/1998 | Kleinerman et al. | ........ | 719/320 |
| 5,754,830 A * | 5/1998 | Butts et al. | ........ | 719/311 |
| 5,784,578 A * | 7/1998 | Galloway et al. | ........ | 710/105 |
| 5,958,013 A * | 9/1999 | King et al. | ........ | 709/227 |
| 6,049,832 A * | 4/2000 | Brim et al. | ........ | 709/237 |
| 6,122,661 A * | 9/2000 | Stedman et al. | ........ | 709/217 |
| 6,182,276 B1 * | 1/2001 | Brawn et al. | ........ | 717/109 |
| 6,233,541 B1 * | 5/2001 | Butts et al. | ........ | 703/27 |
| 6,446,110 B1 * | 9/2002 | Lection et al. | ........ | 709/203 |
| 6,449,649 B1 * | 9/2002 | Janay et al. | ........ | 709/227 |
| 6,643,825 B1 * | 11/2003 | Li et al. | ........ | 715/523 |
| 6,665,868 B1 * | 12/2003 | Knowles et al. | ........ | 717/178 |
| 6,697,088 B1 * | 2/2004 | Hollander | ........ | 715/744 |
| 6,708,189 B1 * | 3/2004 | Fitzsimons et al. | ........ | 707/205 |
| 6,920,629 B2 * | 7/2005 | Kraffert | ........ | 717/124 |

(Continued)

OTHER PUBLICATIONS

Cisco, "Introduction to Telnet TN3270", "http://www.cisco.com/univercd/cc/td/doc/cisintwk/dsgngde/tn3270/tndg_c1.htm" 6 pages, Jan. 22, 1999.*

(Continued)

*Primary Examiner*—J. Bret Dennison
(74) *Attorney, Agent, or Firm*—Jennifer Pearson Medlin, Esq.; Morris Manning & Martin LLP

(57) ABSTRACT

A method and computer system are provided for managing a host session on a remote computer. A request is sent to establish a host session from a client computer. The request includes a presentation space for displaying screen data. The client computer has access to properties files defining the screens for the host session. After the request is sent from the client computer, a response to the request is received in the presentation space from the remote computer. The response includes host screen data. Next, the response from the remote computer is identified by comparing the host screen data in the presentation space to screen data defined in one or more of the plurality of properties files for the host session. If host screen changes are detected during the host session, an error is generated and data associated with the error is presented to a user in an errors file. The user may then correct the error by modifying or updating the properties files associated with the host screens.

13 Claims, 7 Drawing Sheets

U.S. PATENT DOCUMENTS

| | | | |
|---|---|---|---|
| 7,043,534 B1* | 5/2006 | Donnelly et al. | 709/217 |
| 2002/0091818 A1* | 7/2002 | Cascio et al. | 709/224 |
| 2002/0112002 A1* | 8/2002 | Abato | 709/203 |
| 2003/0093534 A1* | 5/2003 | Hartmann et al. | 709/227 |
| 2003/0212751 A1* | 11/2003 | Mathewson, II | 709/208 |
| 2004/0010574 A1* | 1/2004 | Cammick et al. | 709/222 |
| 2004/0015842 A1* | 1/2004 | Nanivadekar et al. | 717/109 |
| 2004/0034719 A1* | 2/2004 | Peterson et al. | 709/250 |
| 2005/0005015 A1* | 1/2005 | Hanners et al. | 709/227 |

OTHER PUBLICATIONS

Robertson et al., IEEE "An Integrated System for Database Visualization", 6 pages, 2002.*

* cited by examiner

30

```
SESSION.PROPERTIES
SCREEN ? = <NAME>, <RULES>, <TEXT>, <SEARCHTYPE., <START>, <END>
SCREEN 1 = BLANK_SCREEN, 0,,1,0,1919
SCREEN 2 = READY_FOR-LOGON, 2, ISNOWREADY FOR LOGON, 1,89,111
SCREEN 3 = SECURITY_SIGN, 1, ACF2 IMS SECURITY SIGN NOW SCREEN,1,21,52
```

```
SECURITY-SIGNON.PROPERTIES
FIELD ? = <NAME>, <START>, <END> <PROTECTED>
FIELD 1 = SCREEN_NAME,21,52,1
FIELD 2 = DATE_STAMP,59,67,2
FILES 3 = TIME_STAMP,69,72,2
FIELD 4 = COMMAND_LINE1,80,159,2
RESPONSE ? = <TEXT>, <SEARCH TYPE>, <START>, <END>, may be repeated
SUCCESS 1 = ACF 2 IMS PF KEY SCREEN, 1, 21, 43, SIGN COMMAND COMPLETED,1,178,200
REJECT 1 = YOUR PASSWORD MUST BE SUPPLIED,1,90,120
REJECT 2 = PASSWORD NOT MATCHED,1,90,110
```

Fig. 10

METHOD, SYSTEM, AND COMPUTER-READABLE MEDIUM FOR MANAGING A HOST SESSION ON A REMOTE COMPUTER

TECHNICAL FIELD

The present invention is related to computer host session management. More particularly, the present invention is related to managing a host session on a remote computer in a computer system.

BACKGROUND OF THE INVENTION

Some computer systems utilize a mainframe or host server computer for supporting a number of simultaneous users in a computer network. Users access data on the host server through connected computer terminals over the network. In order to access the data on the host server computer, the terminal computers are used to connect to and communicate with the host server over the network using a terminal emulation software program such as Telnet. The Telnet program runs on each terminal computer and enables the terminal computer to connect to the host server to establish a host session. Once a host session is established, users may enter commands through the Telnet program which will then be executed as if the user were entering them directly on a screen of the host server. For example, when logging on to the host server to establish a host session the terminal emulation software may be programmed to expect the password field to start at a specific character position on the host logon screen. Thus, once the appropriate password is received by the terminal emulation software, the password is entered as data in the corresponding password field on the host logon screen of the host server.

Periodically, the software running on the host server computer may be updated or modified resulting in changes in formatting of the host screens. These changes may affect the manner in which commands from a connected terminal computer are interpreted such that data specified for a previously defined field on a host screen may no longer be valid for that field. As a result, the host server may no longer recognize the command from the terminal computer and returns an error to the connected terminal computer. For example, the host server will return an error if the password has changed such that a current password entered by the terminal emulation program is no longer valid.

One previous method for maintaining screen changes on host servers requires modifying and recompiling the code in the terminal emulation program. However, modifying and recompiling the terminal emulation program code is often a time-consuming process and requires additional testing, which is often a time-consuming process requiring skilled programming knowledge. Moreover, this method may also require additional testing of the recompiled code to verify that the appropriate modifications have been made. Another previous method for maintaining screen changes requires the use of "screen scraper" programs in which the actual host screens are recorded to capture the changes. However, in most cases such "screen scraper" programs are platform dependent, that is, they require a specific computer operating system in which to operate. Furthermore, the use of "screen scraper" programs requires a user to manually review each captured host screen to locate where the error has occurred making their use inconvenient during automated or mechanized processes.

It is with respect to these considerations and others that the present invention has been made.

SUMMARY OF THE INVENTION

In accordance with the present invention, the above and other problems are solved by methods for managing a host session on a host server or remote computer in which the host screens are predefined in properties files accessible by a terminal or client computer in a computer system. When host screen changes are detected during a host session, an error is generated and data associated with the error is presented to a user in an errors file. The user may then correct the error by simply modifying or updating the properties files associated with the host screens.

According to one method, a request is sent to establish a host session from a client computer. The request includes a presentation space for displaying screen data. The client computer has access to properties files defining the screens for the host session. After the request is sent from the client computer, a response to the request is received in the presentation space from the remote computer. The response includes host screen data. Then, the response from the remote computer is identified by comparing the host screen data in the presentation space to screen data defined in one or more of the plurality of properties files for the host session. Finally, an action is performed based on the identified response.

The properties files may include one or more screen properties files for defining the screen data for the host session. Each screen properties file may include a responses section which may include a response type for the response and identifying text for the response. The response type may be success, analyze, or reject. The step of identifying the response by comparing the host screen data in the presentation space to screen data defined in one or more properties files for the host session may include determining the response type for the response by comparing the host screen data to the identifying text defined for the response in the responses section in a screen properties file. The step of performing an action based on the identified response may include processing the response if the response type is success, or printing the presentation space to an errors file if the response type is reject. The properties files may be Java properties files and the host session may be a TN3270 host session.

In accordance with other aspects, the present invention relates to a computer system for managing a host session. The system includes a remote computer and a client computer in communication with the remote computer in the computer system. The client computer includes a memory device for storing a program file and properties files for defining screens comprising screen data for the host session. The client computer also includes a processor, functionally coupled to the memory device, which is responsive to computer-executable instructions contained in the program file stored in the memory device. The processor is operative to send a request to the remote computer to establish the host session, receive in a presentation space a response to the request from the remote computer, identify a response type for the response, and perform an action based on the response type. The response includes host screen data and the response type is defined in one or more of the properties files.

Aspects of the invention may be implemented as a computer process, a computing system, or as an article of manufacture such as a computer program product or computer-readable medium. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages, which characterize the present invention, will be apparent from a reading of the following detailed description and a review of the associated drawings.

BRIEF DESCRIPTION OF THE DRAWINGS

FIG. 9 illustrates the contents of the common properties file illustrated in FIG. 4 according to one embodiment of the invention.

FIG. 10 illustrates the contents of the screen properties file illustrated in FIG. 5, according to one embodiment of the invention.

DETAILED DESCRIPTION OF THE INVENTION

Figure 1:
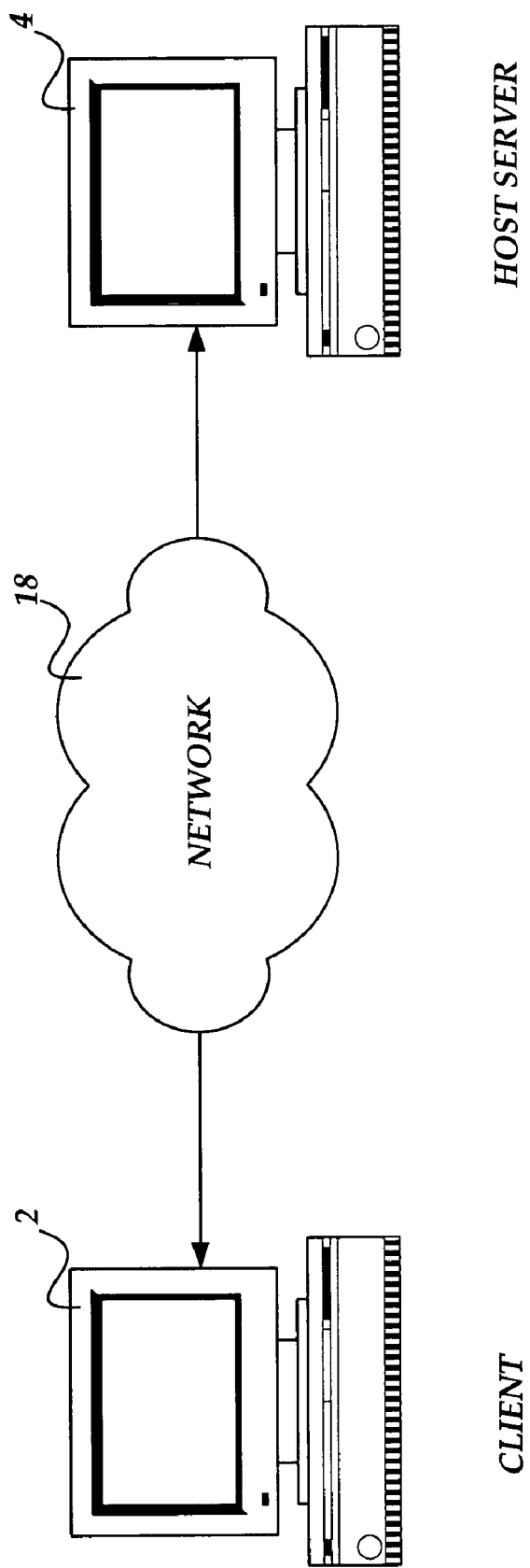
FIG. 1 illustrates a computer network architecture which may be utilized in various embodiments of the invention.

Embodiments of the present invention provide methods, a system, and a computer-readable medium for managing a host session on a remote computer in a computer system. In the following detailed description, references are made to the accompanying drawings that form a part hereof, and in which are shown by way of illustration specific embodiments or examples. Referring now to the drawings, in which like numerals represent like elements through the several figures, aspects of the present invention and the exemplary operating environment will be described.

FIG. 1 and the following discussion are intended to provide a brief, general description of a suitable computing environment in which the invention may be implemented. Those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Turning now to FIG. 1, an illustrative computer network architecture for practicing the various embodiments of the invention will now be described. The computer network includes a terminal or client computer 2 operative to execute one or more application programs. The client computer 2 communicates with a remote or host server computer 2 through the network 18.

Figure 2:
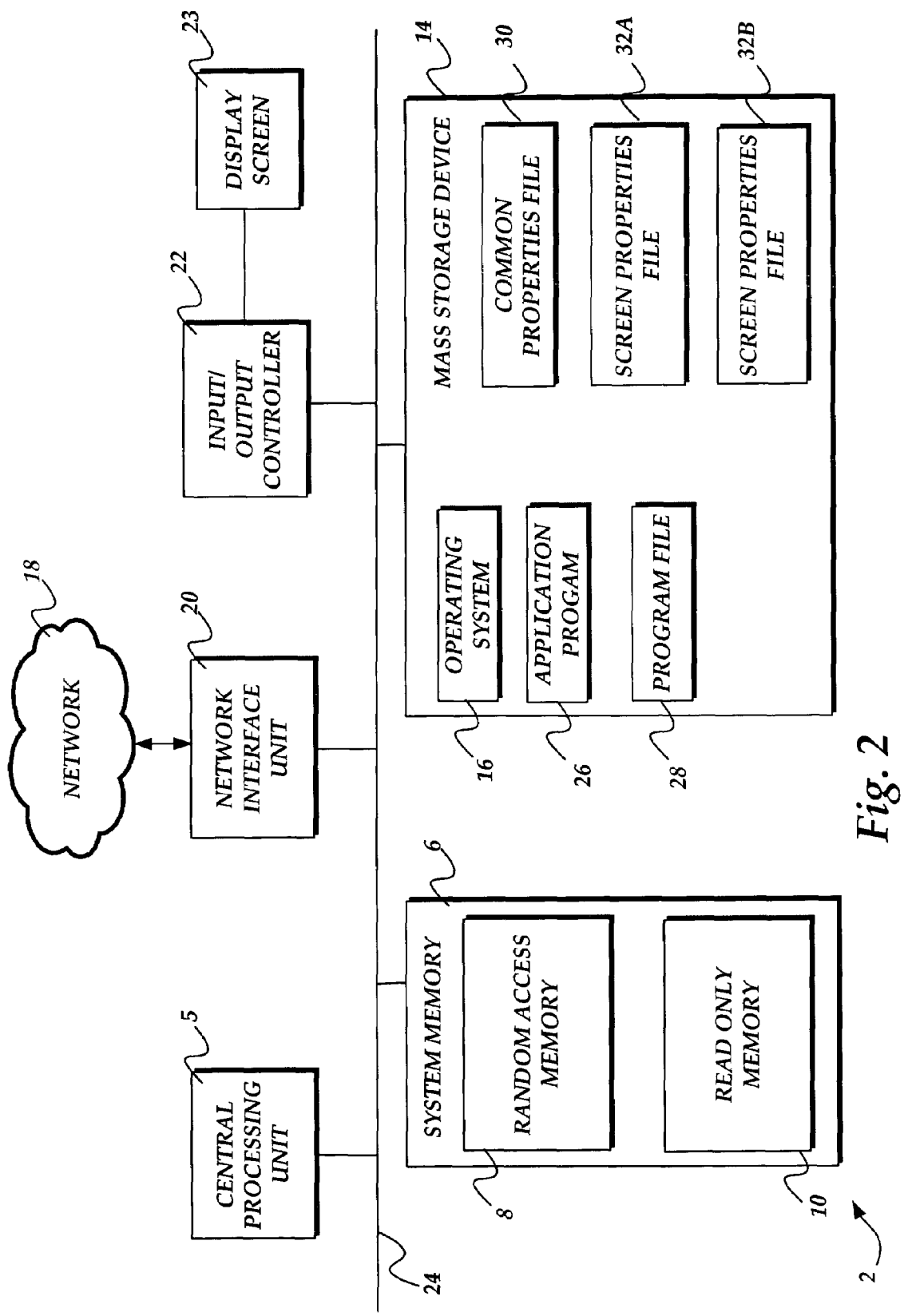
FIG. 2 illustrates a computer system architecture of a client computer utilized in various embodiments of the invention.

Turning now to FIG. 2, an illustrative computer architecture for the client computer 2 (which was discussed briefly above) for practicing the various embodiments of the invention will be described. The client computer 2 may be a standard personal computer operative to execute one or more terminal application programs, such as application program 26, for establishing a host session on a remote computer, such as the host server computer 2 described above in FIG. 1.

Alternatively, the client computer 2 may include another type of computing device operative to access a network 18, such as a personal digital assistant or other type of computer. The computer architecture shown in FIG. 2 illustrates a conventional personal computer, including a central processing unit 4 ("CPU"), a system memory 6, including a random access memory 8 ("RAM") and a read-only memory ("ROM") 10, and a system bus 13 that couples the system memory 6 to the CPU 4.

The client computer 2 further includes a mass storage device 14 for storing an operating system 16, the application program 26, a program file 28, a common properties file 30, and screen properties files 32A and 32B, respectively. The application program 26 may be a terminal emulation program for connecting to remote mainframe computers such as the host server computer 2 described above in FIG. 1. As is known by those skilled in the art, terminal emulation programs typically run on local or client computers and enable these computers to connect to and control one or more remote host servers in a computer network. Typically, a connection is made by entering a valid username and password through the terminal emulation program to establish a "host session" with the host server. Once a host session with the host server is established, commands may be entered through the terminal emulation program which will be executed as if they were entered directly on the server console.

In one embodiment the application program 26 is a "tn3270" terminal emulation program for emulating an IBM 3270 computer terminal which is normally used to communicate with IBM host or mainframe computers over a network. Of course, it will be appreciated that the application program 26 may be used to emulate other terminals as well or may alternatively be a "Telnet" program which is a terminal emulation program for TCP/IP networks such as the Internet. Such alternative terminal emulators are known to those skilled in the art.

The mass storage device 14 also includes the program file 28 which receives and sends commands from the application program 26 to the host server 4. In one embodiment, the program file 28 is a Java program file which contains classes and methods that may be accessed and controlled by the application program 26. The classes and methods include connecting to the host server (i.e., establishing a host session), sending commands to the host server, waiting for a response from the host server, analyzing the host server response, returning the host results to the application program 26, and/or disconnecting from the host. As will be understood by those skilled in the art, the program file 28 may utilize a Java classes file (not shown) containing Java API and system objects and a number of methods which enable a Java process to connect and communicate with a mainframe host session and to send an receive data streams through the connections. The program file 28 utilizes the common properties file 30 and the screen properties files 32A and 32B to manage a host session. In one embodiment, the common properties file 28 and the screen properties files 32A and 32B are Java properties files. The program file 28, the common properties file 30, and the screen properties files 32A and 32B will be described in greater detail below with respect to FIGS. 4-10.

The mass storage device 14 is connected to the CPU 4 through a mass storage controller (not shown) connected to the bus 13. The mass storage device 14 and its associated computer-readable media, provide non-volatile storage for the client computer 2. Although the description of computer-readable media contained herein refers to a mass storage device, such as a hard disk or CD-ROM drive, it should be appreciated by those skilled in the art that computer-readable media can be any available media that can be accessed by the client computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

According to various embodiments of the invention, the client computer 2 may operate in a networked environment using logical connections to remote computers, such as the host server computer 4, through the network 18. The client computer 2 may connect to the network 18 through a network interface unit 20 connected to the bus 13. It should be appreciated that the network interface unit 20 may also be utilized to connect to other types of networks and remote computer systems. The client computer 2 may also include an input/output controller 22 for receiving and processing input from a number of devices, including a keyboard, mouse, or electronic stylus (not shown in FIG. 1). Similarly, an input/output controller 22 may provide output to a display screen 23, a printer, or other type of output device. Although not specifically described herein, it should be understood that the host server computer 4 described in FIG. 1 above may also include many of the same components described above with respect to the client computer 2.

Figure 3:
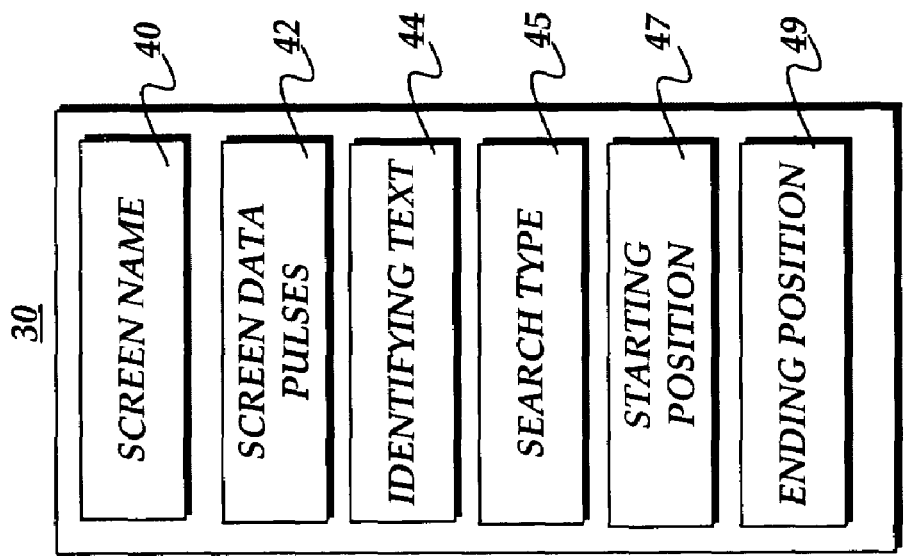
FIG. 3 illustrates the common properties file illustrated in the computer system architecture of FIG. 2, according to an embodiment of the invention.

FIG. 3 illustrates the common properties file 30 briefly discussed above in the description of the computer system architecture of FIG. 2, according to an embodiment of the invention. As discussed above, the common properties file 30 is utilized by the program file 28 for managing a host session. During a host session, a group of screens are utilized to communicate information between the client computer 2 and the host server computer 4. For example, prior to establishing a host session, a logon screen is used to receive valid user name and password data. This data is then sent to the host server computer which returns a response indicating whether or not the logon was successful. One or more screens are then utilized to display the results of the logon attempt. All of the screens of a host session are predefined in the common properties file 30. For a particular screen, the common properties file 30 defines fields for the screen name 40, the number of data pulses to expect for the screen, the identifying text on the screen, the search method used by the program file 28 for locating the identifying text on the screen, and the starting and ending positions on the screen where the identifying text is located.

FIG. 9 shows the contents of an illustrative common properties file called "Session.Properties" for a host session. As shown in FIG. 10, the properties file defines three screens ("Screen 1", "Screen 2", and "Screen 3") defined for use during a host logon session. For example, "Screen 2" has a screen name entitled "Ready_For_Logon" and has a data pulse value of 2. The identifying text for Screen 2" is "Is Now Ready For Logon" and the identifying text has a starting position of 80 and an ending position of 111 on the screen.

Figure 4:
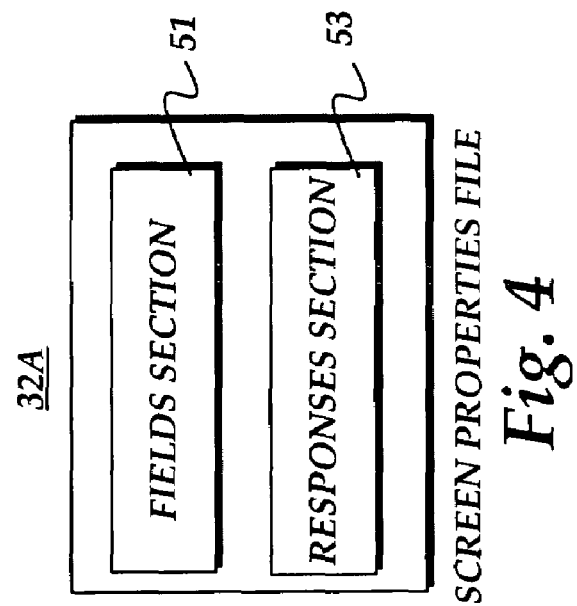
FIG. 4 illustrates a screen properties file illustrated in the computer system architecture of FIG. 2, according to an embodiment of the invention.

FIG. 4 illustrates the screen properties file 32A briefly discussed above in the description of the computer system architecture of FIG. 2, according to an embodiment of the invention. As discussed above, the screen properties files 32A and 32B are utilized by the program file 28 in conjunction with the common properties file 30 to manage a host session. Each individual screen of a host session is defined in a screen properties file. As shown in FIG. 3, the screen properties file 32A includes a fields section 51 for defining screen fields and a responses section 53 for defining responses from the host server 4. The fields section 51 and the responses section 53 will be described in greater detail below with respect to FIGS. 5-7.

Figure 5:
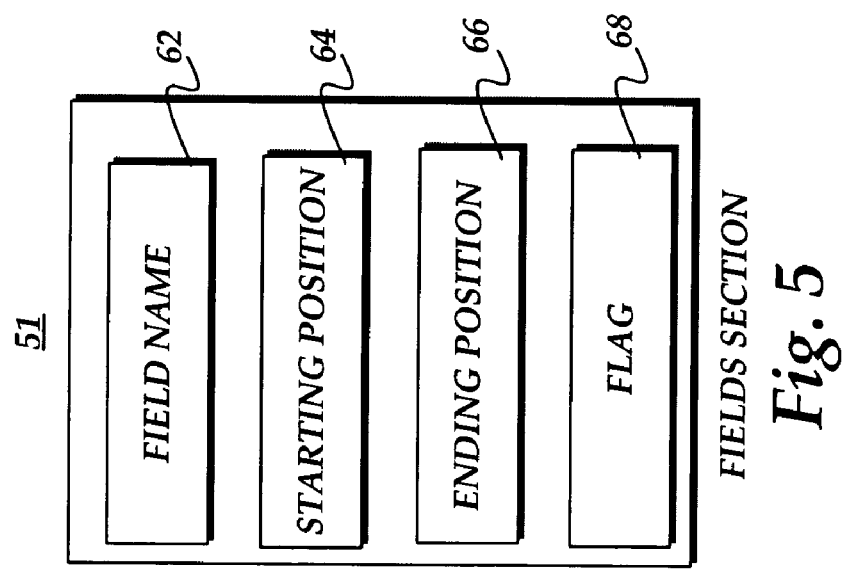
FIG. 5 illustrates the fields section illustrated in the screen properties file illustrated in FIG. 5, according to an embodiment of the invention.

FIG. 5 illustrates the fields section 51 briefly described above in the description of the screen properties file 32A illustrated in FIG. 4, according to an embodiment of the invention. The fields section 51 includes definitions for fields appearing on a host session screen. As shown in FIG. 5, the fields section includes the name of each field on the screen (field name 62), the starting and ending positions on the screen where the field is to be found (starting position 64 and ending position 66), and a flag 68 indicating whether the field is protected (read only) or unprotected (read/write).

Figure 6:
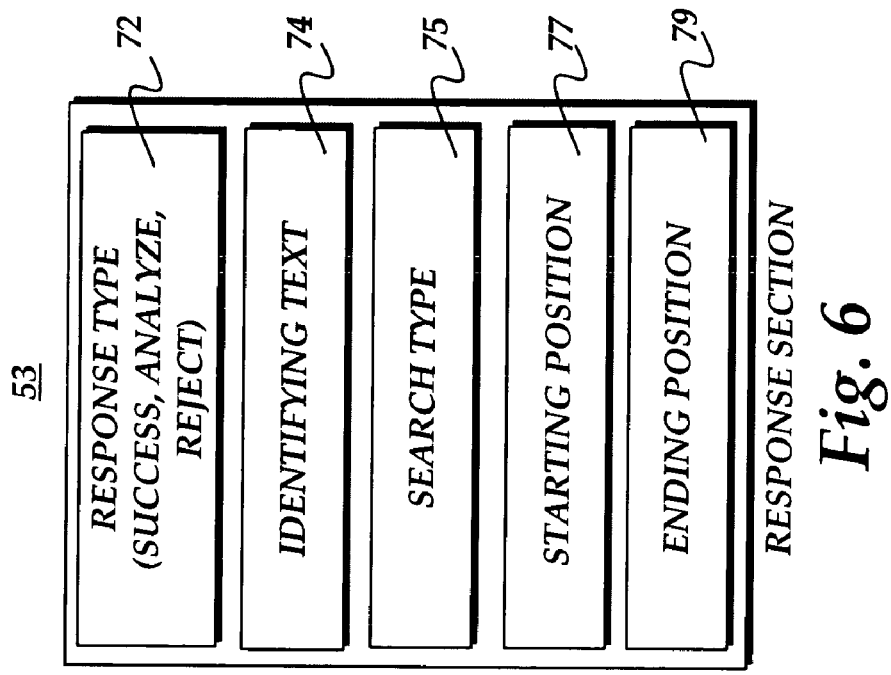
FIG. 6 illustrates the responses section illustrated in the screen properties file illustrated in FIG. 5, according to an embodiment of the invention.

FIG. 6 illustrates the responses section 53 briefly described above in the description of the screen properties file 32A illustrated in FIG. 4, according to an embodiment of the invention. The responses section 53 includes screen definitions for responses from the host server 4 appearing on a host session screen. As shown in FIG. 6, the responses section includes a response type 72. There are three types of responses which may be returned during a host session: success (indicating that a process may continue), reject (indicating that a process may not continue), and analyze (indicating that a process determine the appropriate response). Each response defined in the responses section 53 also includes the identifying text for the response 74, the search type 75 used for finding the identifying text on the screen, and the starting 77 and ending 79 positions on the screen where the identifying text is to be found.

FIG. 10 shows the contents of an illustrative screen properties file called "Security_Signon.Properties" for a screen in a host session. As shown in FIG. 10, the screen properties file defines individual fields for the screen name, date stamp, time stamp, and a command line which are defined in the fields section 51. Also as shown in FIG. 10, the screen properties file defines response types "Success1, Reject1, and Reject2" as well as the identifying text associated with each response.

Figure 7:
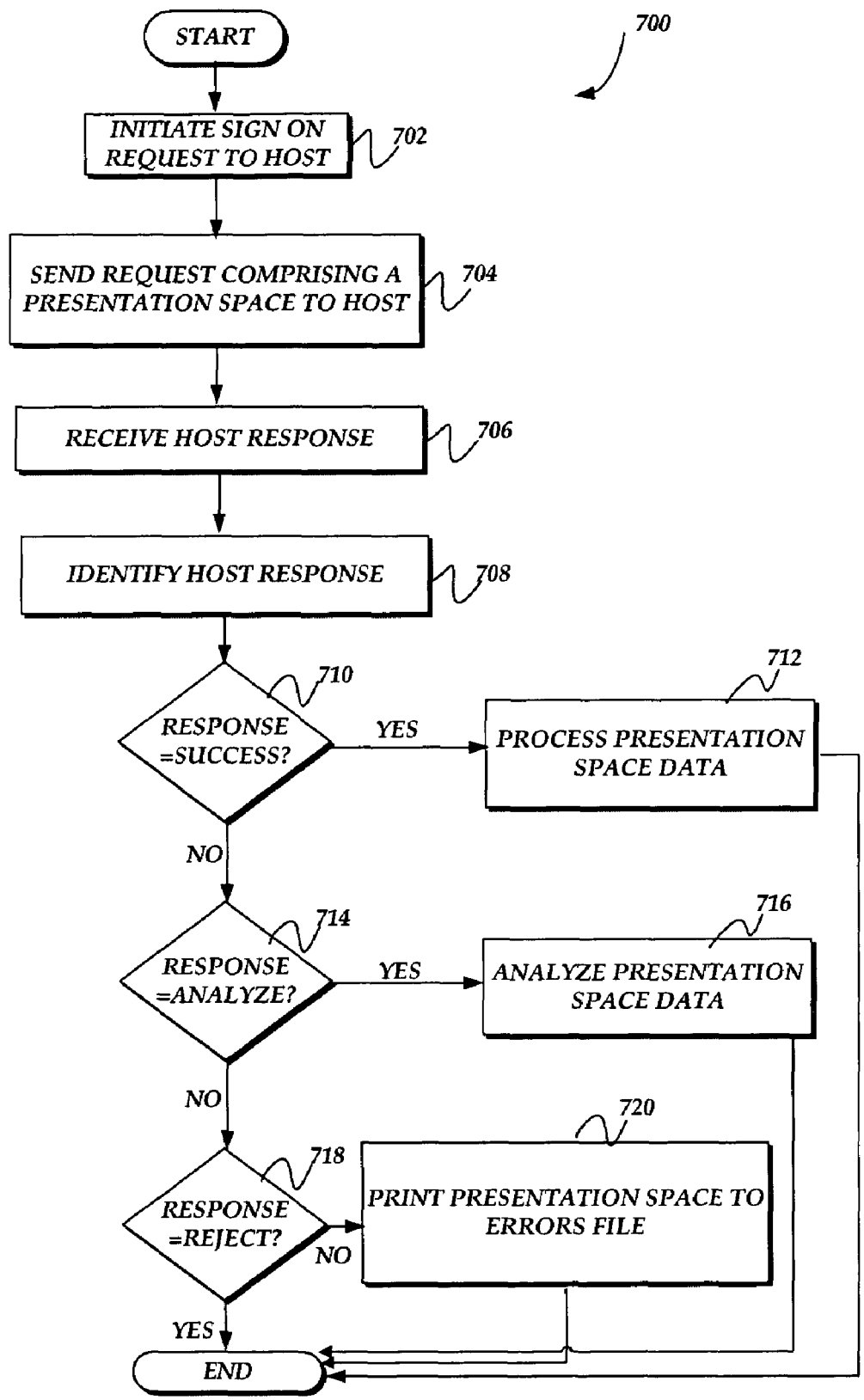
FIG. 7 illustrates logical operations performed in the computer network of FIG. 1 for managing a host session according to an embodiment of the invention.

FIG. 7 illustrates logical operations 700 performed in the computer network of FIG. 1 for managing a host session according to an embodiment of the invention. The logical operations of the various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

The logical operations 700 of FIG. 7 begin at operation 702 where the application program 26 initiates a request to connect the client computer 2 to the host server 4 to establish a host session. The request is sent to the program file 28 which sends the request to the host server 4 at operation 704. As discussed above in the description of FIG. 1, in one embodiment, a Java classes file containing Java API and system objects and a number of methods is utilized to enable the program file 28 to connect and communicate with the host server 4 and to send and receive data streams through a network connection. In this embodiment, the Java classes file sends and receives data between the program file 28 on the client computer 2 and the host server 4.

Figure 8:
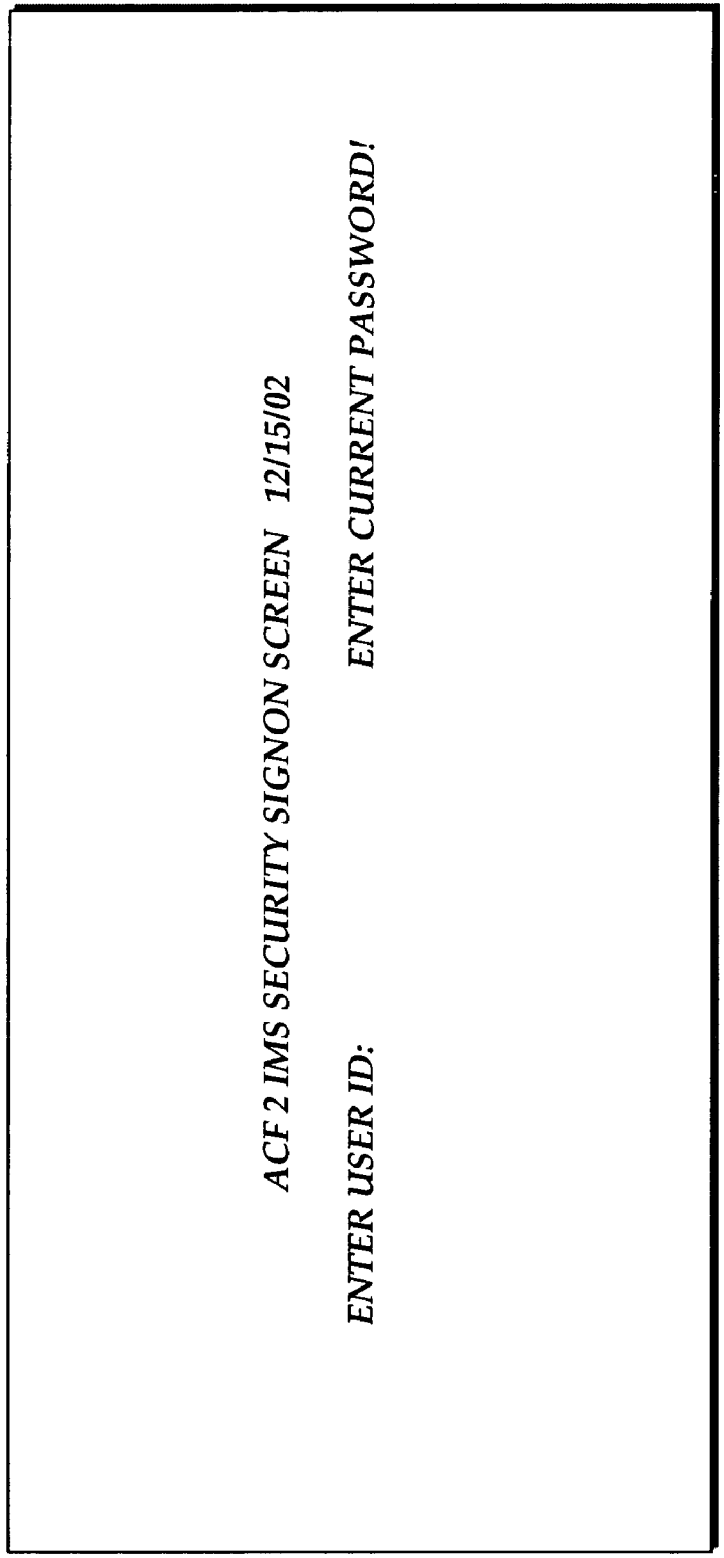
FIG. 8 illustrates a screenshot of a presentation space generated by the program file illustrated in FIG. 2, according to an embodiment of the invention.

The request sent by the program file 28 includes a presentation space and a function command. The function command may include a keyboard input such as the <Enter> key, the <Home> key, or other key. The presentation space is a buffer area for storing screen characters or data. The size of the presentation space is defined to accommodate any fields which may be presented on a host screen. For example, if the host screens in a host session are 24 characters by 80 characters (24×80) then each screen may hold a maximum of 1920 characters. Accordingly, the presentation space will be defined to present a maximum of 1920 characters for each screen. An example of a presentation space is shown in FIG. 8. As shown in FIG. 8, the presentation space 80 displays a signon screen for establishing a host session on the host server 4 requesting a user id and a current password. Returning now to FIG. 7, the request sent by the program file 28 may include the presentation space 80 along with a user id, a password, and an <Enter> function command for logging on to the host server 4.

After sending the request to the host server 4, the logical operations 700 continue at operation 706 where the program file 28 receives a host response including an updated presentation space or host screen, in a data stream from the host server 4. Next, at operation 708, the program file 28 identifies the type of host response which was received. The program file 28 identifies the host response by accessing screen data in the properties files 30, 32A, and 32B and comparing the screen data to the updated presentation space or host screen.

As discussed above with respect to FIG. 4, the screen properties files 32A and 32B include a responses section which includes the possible responses types (i.e., success, analyze, and reject) which may be returned for a screen during a host session as well as identifying text for each type of response. In identifying a response, the program file 28 compares text in a screen received in the host response to identifying text in a predefined screen properties file for the received screen to determine the type of response.

Depending on response type identified for the host response screen at operation 708, the program file 28 may perform a number of actions. At operation 710, if the program file 28 identifies the response type as "success," the program file 28 will send the host screen to the application program 26 which will process the host screen presentation space data for display on the display screen 23 of the client computer 2 at operation 712. At operation 714, if the program file 28 identifies the response type as "analyze," the program file 28 will analyze the host screen to determine the appropriate response type at operation 716. At operation 718, if the program file 28 identifies the response type as reject, the program file 28 notifies the application program 26 that an error has occurred and prints the host screen presentation space to an errors file as well as the field definitions defined for the host screen in its screen properties file at operation 720. This information may be then accessed by a user to assist in a determination of the cause of the error, which may be corrected by modifying or appending a properties file.

Referring again to FIGS. 8 and 10, an example for identifying a host response will now be described according to an illustrative embodiment of the invention. If the presentation space returned in the host response is a host signon screen (such as the one shown in FIG. 8) the program file may identify the host screen by comparing the host screen name (or other identifying text on the screen) to the screen name or identifying text property for the predefined version of the host screen in the common properties file 30. Once the host screen is identified, the program file 28 may identify the type of response by searching for identifying text in the response section defined for the identified host screen. Thus, if the host response screen contains the text "Your Password Must Be Supplied," (FIG. 11) the program file 28 will recognize this text as identifying a "reject" type of response. Once the response type is identified as reject, the program file 28 will print the host signon screen presentation space and the fields described in the associated screen properties file to an errors file.

It will be appreciated by those skilled in the art that the management of host sessions on a remote computer is facilitated by defining host screen data in properties files accessible by a client computer. Thus, when an error is detected during a host session, the error may be corrected by modifying or appending the screen data in the properties files without recompiling code or re-recording changed screens.

Although the invention has been described in language specific to computer structural features, methodological acts and by computer readable media, it is to be understood that the invention defined in the appended claims is not necessarily limited to the specific structures, acts or media described. Therefore, the specific structural features, acts and mediums are disclosed as exemplary embodiments implementing the claimed invention.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

We claim:

1. A method of managing a host session on a remote computer in a computer system, the method comprising:
   sending a request to establish the host session from a client computer, the request including a presentation space, wherein the client computer has access to a plurality of properties files defining a plurality of screens for the host session, wherein the plurality of properties files include at least one screen properties file for defining the screen data for the host session, the at least one screen properties file comprises a responses section, and the responses section comprises a response type for the response and identifying text for the response;
   receiving in the presentation space a response to the request from the remote computer, the response including host screen data;
   identifying the response by comparing the host screen data in the presentation space to screen data defined in at least one of the plurality of properties files for the host session, wherein the screen data defined in at least one of the plurality of properties files for the host session comprises a plurality of field definitions for data appearing on a host session screen, the definitions including at least one of a field name and a flag indicating whether a field is read only or read/write and wherein identifying the response by comparing the host screen data in the presentation space to screen data defined in at least one of the plurality of properties files for the host session comprises determining the response type for the response by comparing the host screen data to the identifying text defined for the response in the responses section of the at least one screen properties file; and performing an action based on the identified response, wherein performing an action based on the identified response comprises:

If the response types is success, then processing the response; and

If the response type is reject, then printing the presentation space to an errors file.

2. The method of claim 1, wherein the response type is one of success, analyze, and reject.

3. The method of claim 1, wherein the plurality of properties files are Java properties files.

4. The method of claim 1, wherein the host session is a TN3270 host session.

5. A computer readable storage medium having computer-executable components for managing a host session between a client computer and a remote computer in a computer system, comprising:

a plurality of properties files for defining a plurality of screens comprising screen data for the host session, wherein the screen data defined in at east one of the plurality of properties files for the host session comprises a plurality of field definitions for data appearing on a host session screen, the definitions including at least one of a field name and a flag indicating whether a field is read only or read/write; and a program file for, sending a request to establish the host session, the request including a presentation space;

receiving in the presentation space a response to the request from the remote computer, the response including host screen data;

identifying a response type for the response, wherein the response type is defined in at least one of the plurality of properties files, wherein the response type is one of success, analyze, and reject; and performing an action based on the response type comprising;

if the response type is success, then processing the response; and if the response type is reject, then printing the presentation space to an errors file.

6. The computer-readable storage medium of claim 5, wherein the plurality of properties fields includes at least one screen properties file for defining the screen data for the host session.

7. The computer-readable storage medium of claim 6, wherein the at least one screen properties file comprises a responses section.

8. The computer-readable storage medium of claim 7, wherein the responses section comprises identifying text for the response.

9. The computer-readable storage medium of claim 8, wherein identifying a response type for the response comprises comparing the host screen data to the identifying text defined for the response in the response section of the at least one screen properties file.

10. The computer-readable storage medium of claim 5, wherein the plurality of properties files are Java properties files.

11. The computer-readable storage medium of claim 5, wherein the host session is a TN3270 host session.

12. A method of managing a TN3270 host session on a remote computer in a computer system, the method comprising:

sending a request to establish the host session from a client computer, the request including a presentation space, wherein the client computer has access to a plurality of Java properties files defining a plurality of screens for the host session;

receiving in the presentation space a response to the request from the remote computer, the response including host screen data;

determining a response type for the responses by comparing the host screen data to identifying text defined for the response in a response section contained in at least one of the plurality of Java properties files;

if the response type for the response is defined as success in the Java properties files, then processing the response; and if the response style for the response is defined as reject in the Java properties files, then printing the presentation space to an errors file.

13. A method of managing a host session on a remote computer in a computer system, comprising:

sending a request to establish the host session from a client computer, the request including a presentation space, wherein the client computer has access to a plurality of properties files defining a plurality of screens for the host session, receiving in the presentation space a response to the request from the remote computer, the response including host screen data;

identifying the response by comparing the host screen data in the presentation space to screen data defined in at least one of the plurality of properties files for the host session, wherein identifying the response by comparing the host screen data in the presentation space to screen data defined in at least one of the plurality of properties files for the host session comprises determining a response type for the response by comparing the host screen data to identifying text defined for the response in a responses section of at least one screen properties file in the at least one of the plurality of properties files, wherein the at least one screen properties file defines the screen data for the host session, wherein the responses section comprises:

a response type for the response; and identifying text for the response; and performing an action based on the identified response, wherein performing an action based on the identified response comprises:

if the response type is success, the processing the response; and

If the response type is reject, then printing the presentation space to an errors file.

* * * * *

UNITED STATES PATENT AND TRADEMARK OFFICE
CERTIFICATE OF CORRECTION

Page 1 of 1

PATENT NO. : 7,548,979 B2
APPLICATION NO. : 10/612427
DATED : June 16, 2009
INVENTOR(S) : Joseph M. Hanners It is certified that error appears in the above-identified patent and that said Letters Patent is hereby corrected as shown below:

Correction to Assignee under 37 CFR § 3.81(b)

On the cover page of the patent, please replace item (73) Assignee, as follows:

Assignee: ~~AT&T Intellectual Property I, L.P.~~

AT&T INTELLECTUAL PROPERTY I, L.P.
Reno, Nevada

Signed and Sealed this
Fifth Day of April, 2011

David J. Kappos
*Director of the United States Patent and Trademark Office*